T. W. ROBINSON.
HARROW.
APPLICATION FILED JAN. 19, 1909.
937,719.
Patented Oct. 19, 1909.
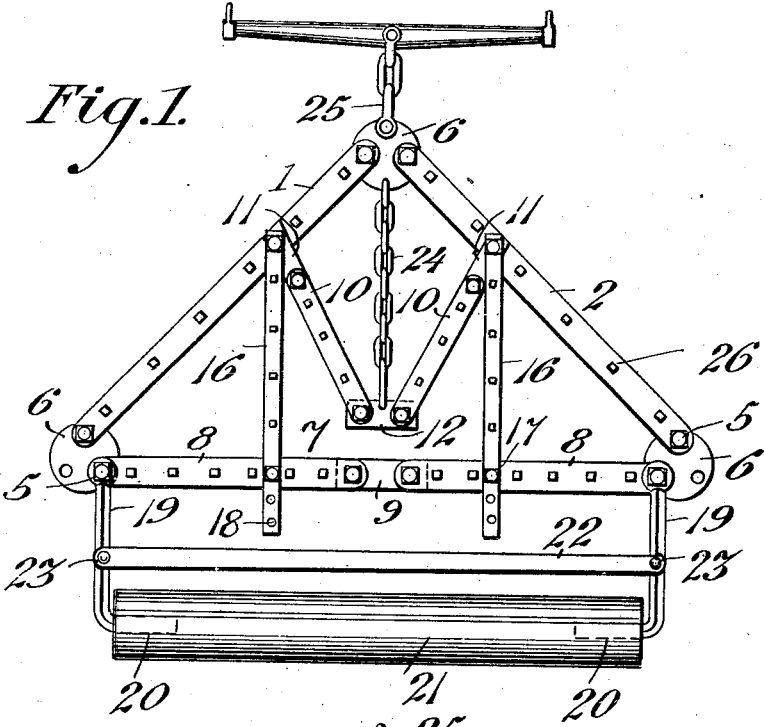
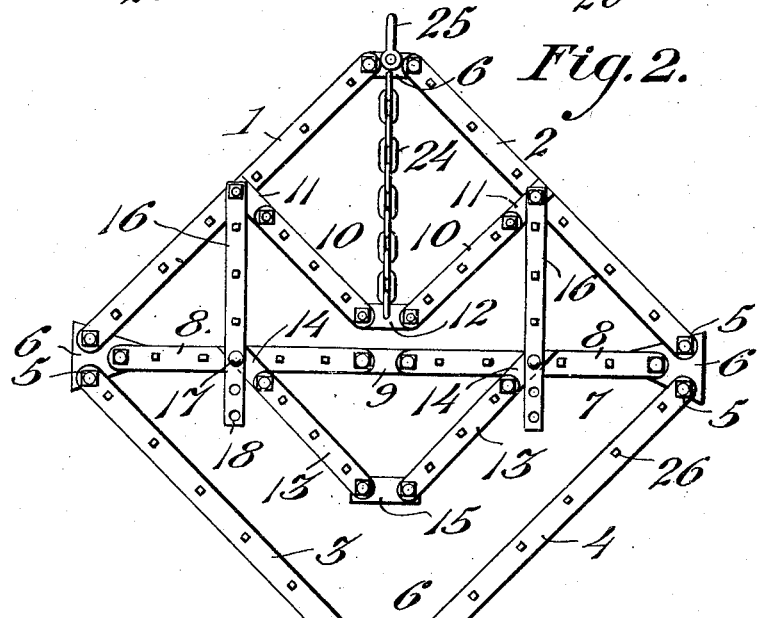
Witnesses
Phil. E. Barnes
P. M. Smith
Inventor
Thomas W. Robinson.
By
Victor J. Evans
Attorney

UNITED STATES PATENT OFFICE.

THOMAS W. ROBINSON, OF TRUSSVILLE, ALABAMA.

HARROW.

937,719. Specification of Letters Patent. Patented Oct. 19, 1909.

Application filed January 19, 1909. Serial No. 473,128.

*To all whom it may concern:*

Be it known that I, THOMAS W. ROBINSON, a citizen of the United States, residing at Trussville, in the county of Jefferson and State of Alabama, have invented new and useful Improvements in Harrows, of which the following is a specification.

This invention relates to harrows and is in the nature of an improvement upon Letters Patent No. 312,166 granted to me February 10, 1885, the object of the present invention being to provide a harrow which is adjustable in width and shape to suit requirements, and which is composed of sections or members, some of which are adjustable and some removable, in connection with a land roller which is detachably connected to the main body of the harrow and carried in rear of the harrow teeth, operating to roll down the soil after the same has been broken up by the harrow teeth.

One of the main features of the present invention resides in the particular means for bracing the jointed sections of the harrow frame in order to render the implement as a whole reliable in use either as a harrow *per se* or as a combined harrow and roller.

With the above and other objects in view, the invention consists in the novel construction, combination and arrangement of parts hereinafter more fully described, illustrated and claimed.

In the accompanying drawings, Figure 1 is a plan view of the combined harrow and roller complete shown adjusted ready for use. Fig. 2 is a similar view of the harrow, showing the form and construction thereof with the roller omitted. Fig. 3 is a detail view showing a clip for fastening a harrow tooth to a side bar.

The harrow proper consists of the side bars 1, 2, 3 and 4, which constitute the marginal portion of the harrow frame, the said bars forming substantially the sides of a square or rectangular frame and having their opposite extremities pivotally connected by means of bolts 5 to a series of corner plates 6 which may be either round or of disk form, as shown in Fig. 1, or rectangular or triangular, as shown in Fig. 2, the main idea being to pivotally connect the outside or marginal bars of the frame, whereby the frame may be made to assume a square shape or a diamond shape elongated either in the direction of movement of the harrow or transversely thereof in order to provide the necessary sweep to the harrow.

The harrow also comprises the diagonal bar 7 which comprises the oppositely arranged sections 8 pivotally connected at their outer ends to the adjacent corner plates 6 and pivotally connected at their inner ends to a coupling plate or link 9.

Extending backward from the front marginal bars 1 and 2 and at an inclination to the direction of travel are the inner oblique harrow bars 10 which are pivotally connected at their outer ends to the bars 1 and 2 by links 11, the inner ends of the bars 10 being pivotally connected to a coupling plate or link 12. Other oblique harrow bars 13 are pivotally connected to links 14 on the diagonal bar 7 and extend rearwardly and convergently, the rear ends thereof being pivoted to a coupling plate or link 15.

In order to brace the pivotally connected bars of the harrow frame and prevent the sections thereof from working on their pivots, I employ a pair of braces 16 which are connected at their forward ends to the forward marginal bars 1 and 2 of the harrow frame and are bolted or otherwise connected at 17 to the sections 8 of the diagonal harrow bar 7, the braces 16 being provided with a plurality of holes 18 which provide for the varying distances between the forward bars 1 and 2, and the diagonal bar 7. The necessity for this adjustment will be apparent by comparing Figs. 1 and 2.

In adapting the harrow to a combined harrow and roller, rearwardly extending arms 19 are secured either to the diagonal bar 7 or the lateral corner plates 6, as shown in Fig. 1, said arms being provided with inwardly extending journals 20 upon which the roller 21 is mounted. A tie bar 22 extends across between the arms 19 and is detachably connected thereto at its opposite ends, as shown at 23, so that by detaching the bar 22, the arms 19 are swung outward away from each other to permit the roller 21 to be removed.

The implement hereinabove referred to is thus adapted to be used as a combined harrow and roller or as a harow *per se*.

A draft chain 24 extends from the link or coupling plate 12 forward to the advance joint or corner plate 6, and a clevis eye 25 is connected to said forward joint plate, as shown in Figs. 1 and 2, to provide for hitching the draft animals to the implement. The harrow teeth shown at 26 may either be connected directly to the harrow bars by inserting the ends therein or they may be connected to the harrow bars by means of U-shaped clips 27, as shown in Fig. 3.

I claim:

1. The combination of a marginal frame comprising corner plates and side bars pivotally connected to said plates, a diagonal bar extending between the lateral side bars and comprising sections pivotally connected with each other and with lateral corner plates, oblique harrow bars extending from the side bars provided with harrow teeth, and braces extending from the side bars to the diagonal bar for holding the pivoted bars of the harrow frame rigid relatively to each other.

2. A harrow frame comprising side bars carrying harrow teeth and pivotally connected with each other at their ends to form a marginal frame, a diagonal bar interposed between the side bars, braces connected to the side bars and adjustably connected to the diagonal bar, harrow teeth carrying bars extending from the side bars obliquely and having their ends pivotally coupled together, arms extending backward from the frame and having inturned journal portions, a roller carried by said journal portions, and a tie bar extending between said arms and connected therewith, substantially as described.

In testimony whereof, I affix my signature in presence of two witnesses.

THOMAS W. ROBINSON.

Witnesses:
L. B. HARRIS,
J. B. MARTIN.